No. 687,172.  
Patented Nov. 19, 1901.
C. UPTON.
VARIABLE SPEED GEARING.
(Application filed Jan. 2, 1901.)
(No Model.)
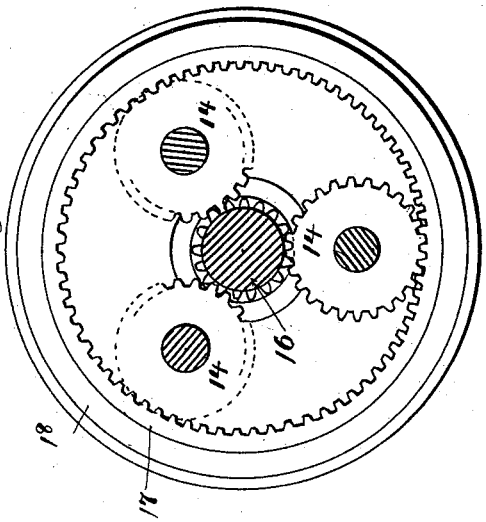
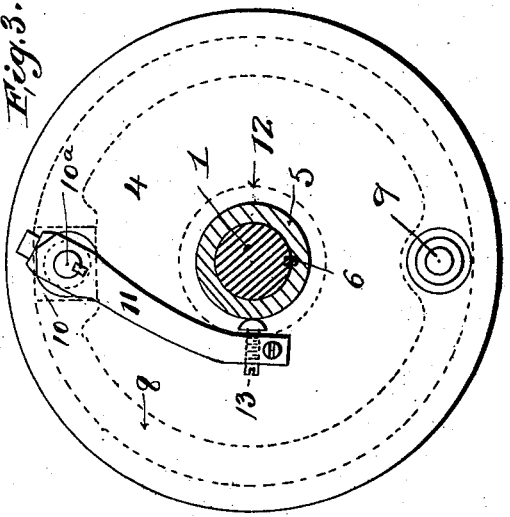
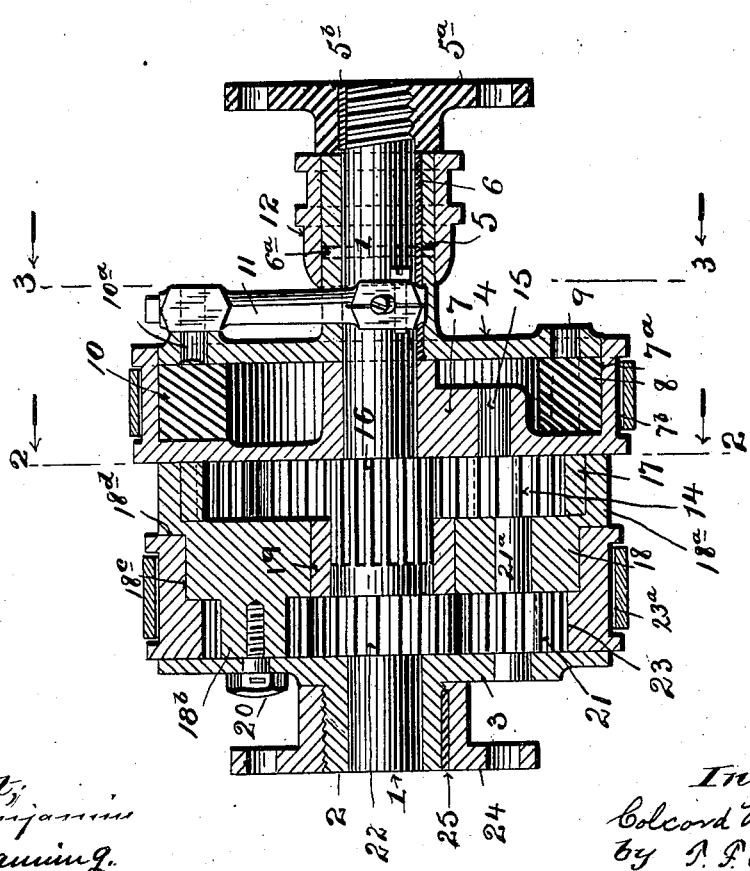
Attest:  
C. W. Benjamin  
M. Manning
Inventor:  
Colcord Upton  
by J. F. Bourne  
his atty

UNITED STATES PATENT OFFICE.

COLCORD UPTON, OF BEVERLY, MASSACHUSETTS, ASSIGNOR TO THE UPTON MACHINE COMPANY, A CORPORATION OF NEW YORK.

VARIABLE-SPEED GEARING.

SPECIFICATION forming part of Letters Patent No. 687,172, dated November 19, 1901.

Application filed January 2, 1901. Serial No. 41,790. (No model.)

*To all whom it may concern:*

Be it known that I, COLCORD UPTON, a citizen of the United States, and a resident of Beverly, Essex county, Massachusetts, have invented certain new and useful Improvements in Variable-Speed Gearing, of which the following is a specification.

The object of my invention is to provide improved means for transmitting variable speeds from a driving to a driven part; and the invention consists in the novel details of improvement that will be more fully hereinafter set forth and then pointed out in the claims.

Reference is to be had to the accompanying drawings, forming part hereof, wherein—

Figure 1 is a central section of a gearing embodying my invention. Fig. 2 is a cross-section on the line 2 2 in Fig. 1, and Fig. 3 is a cross-section on the line 3 3 in Fig. 1.

In the accompanying drawings similar numerals of reference indicate corresponding parts in the several views.

The numeral 1 indicates a shaft which in the example of my invention illustrated is utilized as the driving part or member of the gearing, and 2 is a driven part, indicated in the form of a sleeve or hub adapted to rotate around or concentrically with the shaft 1, being shown connected with or extending from a support or disk 3. To the shaft 1 is suitably secured a support 4, shown in the form of a disk provided with an extension or sleeve 5, through which the shaft extends, said sleeve and shaft being shown connected together by a key 6 and a pin $6^a$. The shaft 1 is shown provided with an extension or flange $5^a$, secured thereto by threads and a key $5^b$ and adapted to be connected with a suitable source of power—such as motor, engine, or the like—whereby the latter is coupled direct to the shaft 1 for rotating the same; but it is evident that the shaft may be connected with the motor in any other suitable manner, as by a sprocket and chain or gear.

7 is a disk or drum mounted to rotate freely around shaft 1, and its rim $7^a$ is shown coacting with the disk 4 to form a substantially dust-tight chamber, within which friction devices are located for the purpose of firmly uniting the parts 4 and 7 together, and thereby connecting the shaft 1 with the part 7. The friction devices I have shown consist of a split ring 8, connected with the disk 4 by a pin 9, and between the separated ends of said ring is located a spreader 10, shown in the form of a rectangular block having a pivotal portion $10^a$, journaled in a bearing on the disk or support 4, to which portion $10^a$ is connected an operating-arm 11, whose outer end extends over shaft 1 and is adapted to be engaged by a cam-sleeve 12, that is mounted to slide upon the sleeve 5 and adapted to pass under the arm 11, the latter being shown provided with an adjustable screw 13 to regulate the amount of movement of said arm by the sleeve 12. When the arm 11 is moved outwardly by the sleeve 12, the spreader 10 will rotate on its pivot $10^a$, and its squared or rectangular portion between the ends of the split ring 8 will expand the latter into frictional engagement with the rim $7^a$ of the member 7, thereby causing the latter to rotate with shaft 1. Other friction devices, however, can be used to connect the shaft 1 with the members 7, if desired. The drum or member 7 is to be held from rotation at certain times, which may be done by a brake-band fitting within a peripheral groove $7^b$, any well-known means for operating the same being utilized.

The drum or member 7 on the side opposite the friction devices carries one or more pinions or gears 14, shown mounted upon a pivot or spindle 15, carried by the member 7 and in mesh with a gear 16 on shaft 1. The pinion or pinions 14 also mesh with an internal rack 17, that is carried by or formed on an annular or ring-like member 18, shown provided with an annular web $18^a$, to which said rack may be attached in any suitable manner, the member or ring 18 being shown surrounding a bushing or sleeve 19, located upon shaft 1. The ring or member 18 is secured to the member or support 3 and is shown provided with a projection $18^b$, secured to the member 3 by a screw 20, there being any suitable number of such projections and screws, preferably three. By this means a space is provided between the ring or annular member 18 and the member 3, in which one or more pinions or gears 21 are located and supported by spindles or pivots 21ª, shown connected at the ends to both members 3 and 18, whereby a firm support for said pivots is afforded and the members 3 and 18 are rotatively connected. The pinions or gears 21 are in mesh with a gear 22 upon shaft 1, and the pinions 21 are also in mesh with an annular rack 23, the latter being guided by the part 18 to rotate therearound, the member 18 having an annular guideway 18ᶜ to receive the member 23. The member 18 is also shown as having radially-disposed surface 18ᵈ, against which one side of the member 23 is guided. The member 23 is thus guided to rotate between the members 18 and 3. The rack 23 is adapted to be held from rotation at certain times, and for this purpose is shown provided with a peripheral groove 23ª, adapted to receive a brake-band, which may be supported and operated in any well-known manner. The driven part 2 is adapted to be connected with a part to be driven, and to provide a direct connection I have shown an extension 24, secured upon the part 2, as by screw-threads, and a locking-pin 25; but the part 2 can be connected to the part to be driven by sprocket and chain or gear or in other suitable manner.

In the arrangement shown it will be seen that the shaft 1 is not provided with bearings exterior to the mechanism described, because the parts 5ª and 24 can be secured between the proper members of the motor or other driving part and the part to which motion is to be communicated, which are not shown, but which themselves will be provided with proper bearings, and the latter will thus support the gearing. By this means the space that would be occupied by separate bearings for the gearing can be saved. It will be evident, however, that, if desired, the shaft 1 could extend beyond the gearing to be provided with bearings in any well-known manner, in which case the sprocket and chain or the gear before mentioned can be used to operate shaft 1 by the driver and to communicate motion from part 2 to the part to be driven.

The gearing being supported in suitable manner, as above indicated, and the brake-bands adapted to the gearings in well-known manner, the operation will be understood from the following: If it is desired to rotate the part to be driven at the same speed and in the same direction as the motor or other driver, the sleeve 12 will be slipped under the arm 11 sufficiently far to properly set the friction devices in connection with the member 7, whereupon the parts will all be locked together, so as to rotate in unison, because the pinion 14 cannot then rotate independently of gear 16, and will thus carry rack 17 at the same speed as shaft 1, and as rack 17 and its member 18 are rigidly united to the member 3 the part 24 and the parts connected with it will rotate uniformly with the shaft 1. If it is desired to rotate the part to be driven in the same direction as shaft 1, but at a slower speed, the rack 23 will be held from rotation by the brake-band while the friction devices are out of connection with the member 7. Shaft 1 will rotate its gear 22, which will rotate pinion 21 on its axis, and as the rack 23 does not rotate the pinion 21 will travel at a relatively slow speed within rack 23 in the direction of rotation of shaft 1, carrying around with it the members 3 and 24 and the parts connected therewith. When it is desired to cause the part 2 to rotate in a direction reverse to the direction of rotation of shaft 1, the member 7 will be held from rotation while the friction devices are disconnected therefrom, and thereupon the gear 16 will rotate the pinion 14 upon its axis, and the latter will cause rack 17 to rotate oppositely to the direction of rotation of shaft 1, the part 2 being correspondingly rotated. The pinion 21 at this time rotates freely on its axis and causes the rack 23 to rotate freely, whereby no interference in the gearing occurs.

It will be seen that the gears and racks are all contained within an exterior covering, whereby dust is practically excluded, and the parts are compact, simple in construction, and effective in use.

I do not limit my invention to the details of construction shown and described, as they may be varied without departing from the spirit thereof, and it will be apparent that the part 2 or 3 can be connected with a motor or driver and the shaft with a part to be driven.

Having now described my invention, what I claim is—

1. The combination of a driving part, a member rotative independently thereof, means for firmly connecting them, a means to limit rotation of said member, a pinion carried by said member, a gear connected with the driving part and in mesh with said pinion, a rack in mesh with said pinion, a pinion connected with said rack, a gear connected with the driving part and in mesh with said pinion, a rack in mesh with said pinion, and a part to be driven connected with the first-mentioned rack, substantially as described.

2. The combination of a driving part, a member rotative independently thereof, means for firmly connecting them, means to limit rotation of said member, a pinion carried by said member, a rack in mesh with said pinion and mounted to rotate freely therearound, means to rotate said pinion by the driving part, a driven part connected with said rack, and means for rotating the driven part by the driving part in the same direction as the latter and at a slower speed than the speed of the driving part, substantially as described.

3. The combination of a driving part, a member rotative independently thereof, means for firmly connecting them, a rotative member having a rack and a guideway, a rack guided to rotate around the guideway, a driven part connected with the last-mentioned member, a pinion carried by said member in mesh with said rack, means to limit rotation of said rack, means for rotating said pinion, a pinion carried by the first-mentioned member in mesh with the first-mentioned rack, and means for rotating said pinion by the driving part, substantially as described.

4. The combination of a shaft, a member rotative independently thereof, means for connecting said shaft with a driver, means for connecting said member with a part to be driven, a second member rotative independently of said shaft, means for firmly connecting said member and the shaft, a rack connected with the first-mentioned member, gearing operated by said shaft for actuating said rack, means for limiting rotation of the second-mentioned member, a loose rack, means for limiting its rotation and gearing connecting the shaft with said rack and with the first-mentioned member, substantially as described.

5. The combination of a driving part, a member rotative independently thereof and provided with projections, a part to be driven by said member and provided with an extension secured to said projections forming a space between said member and said extension, a pinion carried by said member and located within said space, gearing for causing the driving part through said pinion to rotate the part to be driven, and a brake to coact with the gearing, substantially as described.

COLCORD UPTON.

Witnesses:
EDWD. ELDRED,
SAMUEL H. STONE.